Figure 1:
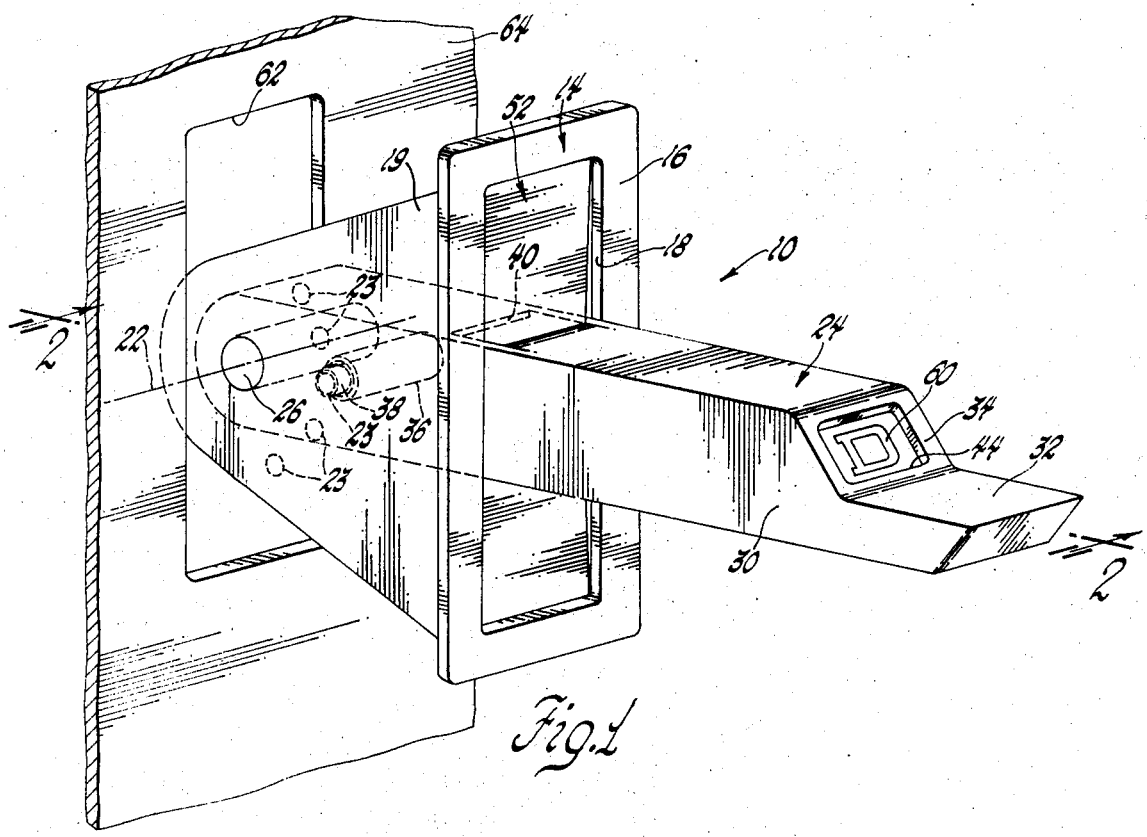

United States Patent [19]
Faloon

[11] 3,824,948
[45] July 23, 1974

[54] CONTROL LEVER ASSEMBLY

[75] Inventor: William L. Faloon, Dearborn, Mich.

[73] Assignee: General Motors Corporation, Detroit, Mich.

[22] Filed: June 7, 1973

[21] Appl. No.: 367,758

[52] U.S. Cl............. 116/124 R, 74/473 R, 74/519, 200/167 R
[51] Int. Cl................................................. G09f 9/00
[58] Field of Search............ 116/124 R, 135, 115.5, 116/124.1, 124.3; 40/331, 86; 200/167 R; 74/10.9, 473 R, 473 P, 491, 492, 519, 523; 73/144

[56] References Cited
UNITED STATES PATENTS

| | | | |
|---|---|---|---|
| 2,078,637 | 4/1937 | Maden | 116/124.3 |
| 2,811,618 | 10/1957 | Cole et al. | 200/167 R X |
| 3,084,659 | 4/1963 | Griffen | 116/124 R |
| 3,329,013 | 7/1967 | Beindorf et al. | 73/144 |
| 3,446,070 | 5/1969 | Hickox | 116/135 X |

Primary Examiner—Louis J. Capozi
Attorney, Agent, or Firm—Saul Schwartz

[57] ABSTRACT

A position indicating lever assembly for controlling the operating range of a mechanical apparatus having a plurality of operating ranges, the assembly including an operating lever having a viewing portion thereon and adapted for pivotal movement relative to a fixed base through an included angle of less than 180°, a ribbon element attached at each end to the base and trained over a ribbon support within the lever, and a plurality of indicator symbols on the ribbon element, the ribbon element being shiftable relative to the lever in response to pivotal movement of the latter so that the indicator symbols sequentially index in the viewing portion to signal the position of the lever in terms of the operating range of the controlled mechanical apparatus.

3 Claims, 2 Drawing Figures

PATENTED JUL 23 1974  3,824,948

CONTROL LEVER ASSEMBLY

This invention relates generally to mechanical control apparatus and more particularly to an arrangement for visually indicating the angular position of a control lever.

Very often in industrial equipment applications the operating mode or range of a particular machine or apparatus depends upon the angular position of a control lever relative to some fixed reference. If the machine or apparatus happens to have a plurality of operating ranges it is very desirable to have some visual indication depicting which range the machine or apparatus is functioning in. For example, it is desirable to have a visual indication of the current operating range of an automobile type automatic transmission which is typically controlled by a manually operable shift lever pivotable between a plurality of angular control positions corresponding to the number of operating ranges of the transmission, the ranges typically including "Park", "Reverse", "Neutral", "Drive" and "Low". A control lever assembly constructed according to this invention embodies a novel structural arrangement which automatically indicates the angular position of the control lever in terms of the operating range of the controlled mechanism without the use of remote indicator scales or the like.

The primary feature, then, of this invention is that it provides an improved control lever assembly for a mechanical apparatus susceptible to control by a pivotable lever. Another feature of this invention is that it provides an improved control lever assembly which automatically indicates the angular position of a lever portion of the assembly without employing remote indicating devices. Yet another feature of this invention resides in the provision in the control lever assembly of a pivotable operating lever and a ribbon element associated with the operating lever having a plurality of indicator symbols thereon, the ribbon element being movable relative to the operating lever in response to pivotal movement of the latter so that the indicator symbols corresponding to the various angular positions of the lever sequentially index relative to a viewing portion of the lever. A further feature of this invention resides in the provision of an operating lever having a ribbon support adjacent the viewing portion and a pair of ribbon apertures, the ribbon being trained over the support within the operating lever so as to be visible through the viewing portion and extending out of the operating lever through the apertures for rigid attachment to a relatively fixed base so that pivotal movement of the lever effects relative sliding movement between the ribbon element and the ribbon support and consequent sequential indexing of the indicator symbols with respect to the viewing portion.

Figure 2:
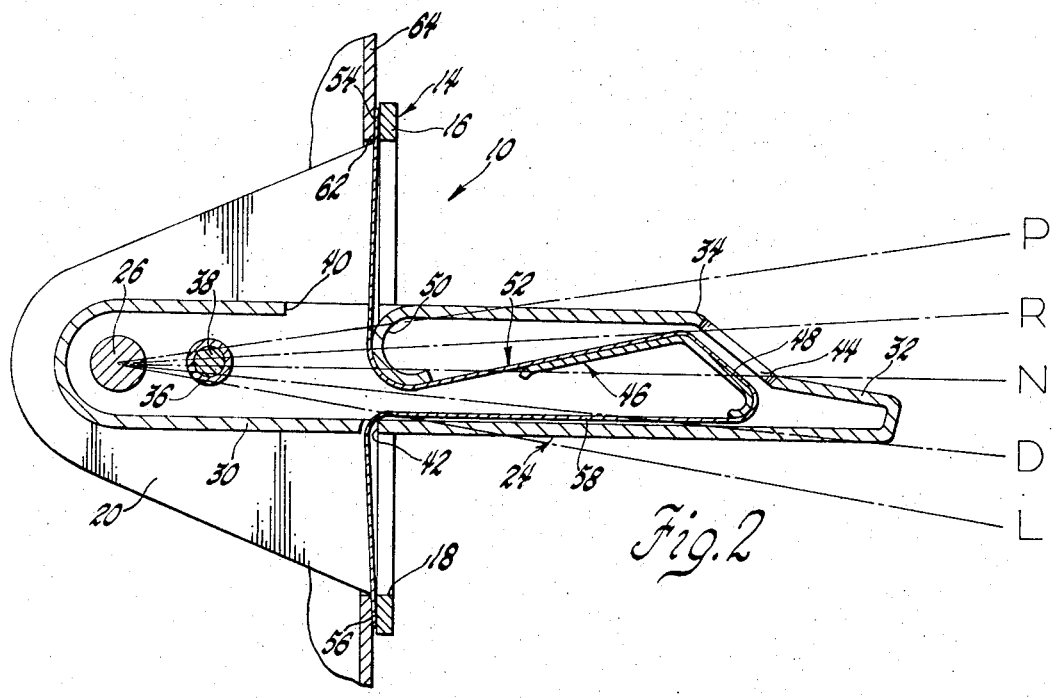

These and other features of this invention will be readily apparent from the following specification and from the drawings wherein:

FIG. 1 is an exploded perspective view of a control lever assembly constructed according to this invention; and FIG. 2 is a sectional view taken generally along the plane indicated by lines 2—2 in FIG. 1 and showing the control lever assembly and associated mounting structure in assembled relation.

Referring now to FIG. 1 of the drawings, a position indicating control lever assembly according to this invention and designated generally 10 is depicted and includes a housing 14 having a bezel portion 16 defining an elongated rectangular aperture 18. Behind the bezel portion, the housing 14 includes a pair of vertically oriented and laterally spaced triangular lugs 19 and 20 which may be integral with the bezel portion or otherwise rigidly secured thereto. The lugs 19 and 20 include a pair of apertures aligned along a transverse axis 22 of the housing. The lug 19 further includes a plurality of detent notches 23 angularly spaced along an arc about the axis 22.

The lever assembly 10 further includes an operating lever 24 supported on a pin 26 disposed in the aligned apertures for pivotal movement about the axis 22. The lever 24 projects through the aperture 18 and includes a generally hollow rectangular body 30 defining a tab portion 32 and a shoulder 34. The width of the body 30 of the lever generally corresponds to the width of the aperture 18 and the lever is pivotable through an included angle substantially less than 180°, the angular movement of the lever being limited at the extremes by the opposite ends of the aperture 18.

As seen best in FIG. 2, the body 30 of the operating lever 24 is hollow and has a detent support tube 36 mounted therein at a predetermined distance from the pivot axis 22 corresponding to the radius of the arc along which the detent notches 23 are disposed. The support tube 36 has disposed therein a relatively light coil spring, not shown, and a detent 38, the spring urging the detent out of the tube 36 and through an appropriate aperture in the side of the body of the lever into engagement on respective ones of the notches 23. Accordingly, as the operating lever 24 is moved through the included angle defined by the aperture 18, the detent 38 cooperates with the notches 23 in releasably maintaining the operating lever in one of a plurality of control positions.

Referring again to FIG. 2, the body 30 of the operating lever further includes a first ribbon aperture 40, a second ribbon aperture 42 and a generally rectangular viewing portion or window 44 on the shoulder 34. A ribbon support 46 is rigidly attached to the body 30 within the interior of the latter and defines a surface portion 48 registering with and parallel to the plane of the viewing portion 44. A generally arcuate ribbon guide 50 is disposed on the operating lever within the body adjacent the first ribbon aperture 40.

The ribbon guide 50 and the ribbon support 46 cooperating in supporting on the operating lever an elongated, flexible ribbon element 52 having a first end 54, a second end 56, and an intermediate portion 58 therebetween. The ribbon element of the intermediate portion 58 has a plurality of indicator symbols thereon, only one symbol 60 being shown in FIG. 1, corresponding in number to the number of control positions of the operating lever. The ribbon element 52 enters the operating lever through the first ribbon aperture 40 and is trained over the ribbon guide 50 and around the support 46 and exits the operating lever through the second ribbon aperture 42. The first end 54 of the ribbon element is rigidly attached to the bezel portion 16 adjacent the upper end of the aperture 18 and the second end 56 of the ribbon element is similarly rigidly attached to the bezel portion adjacent the lower end of the aperture 18. The width of the ribbon element is generally equal to the width of the aperture 18 so that the portions of the ribbon element extending above and below the operating lever generally close the aperture thereby to provide an attractive exterior appearance.

The indicator symbols as exemplified by symbol 60 are disposed in longitudinally spaced relationship along the intermediate portion 58 of the ribbon element and are situated with respect to the ends 54 and 56 of the latter such that the symbols are disposed generally adjacent the surface portion 48 of the support 46. The ribbon element is adapted for sliding movement relative to the surface portion 48 so that various ones of the indicator symbols are visible through the viewing portion 44 as the ribbon element slides therebelow. Since the ribbon element is restrained against longitudinal bodily movement relative to the bezel portion 16, pivotal movement of the operating lever 24 about the axis 22 initiates relative sliding movement between the ribbon element and the support 46 so that the indicator symbols index relative to the viewing portion.

Describing now an automotive application of the control lever assembly 10 wherein the operating lever 24 controls the operating range of the automatic transmission of the vehicle, the assembly is installed as a unit in an aperture 62 in a panel section 64 of the vehicle. The panel section is representative of any convenient mounting surface as for example the instrument panel. When so installed the lugs 19 and 20 and a portion of the operating lever 24 project behind the panel section. The transmission to be controlled has a plurality of operating ranges such as Park, Reverse, Neutral, Drive and Low and is operatively connected to the operating lever 24 by a conventional linkage or motion transmitting cable arrangement, not shown, such that pivotal movement of the operating lever alters the operating range of the transmission. In particular, when the operating lever assumes any one of the angular positions designated P, R, N, D, L in FIG. 2, the transmission is placed in the correspopding one of the operating ranges. The detent notches 23, of course, are spaced to correspond to the angular position P, R, N, D and L thereby to cooperate with the detent 38 in releasably maintaining the operating lever in any one of the control positions.

Referring particularly now to FIG. 2, the length of the ribbon element 52 and the placement thereon of the indicator symbols is predetermined to insure that the proper symbol appears in the viewing portion 44 when the operating lever is in any particular control position. For example, the indicator symbols P, R, N, D and L are marked on the ribbon element 52 at predetermined intervals so that when the operating lever is in the control position corresponding to the drive or D operating range of the transmission, the D indicator symbol 60 appears in the viewing portion 44 visually identifying the control position of the operating lever. When it is desired to alter the operating range of the transmission, the tab portion 32 is manually grasped and force applied to overcome the detent 38 and move the operating lever to the control position corresponding to the desired operating range. As the operating lever pivots the ribbon element 52 slides longitudinally of itself relative to the surface portion 48 so that the indicator symbols sequentially index below the viewing portion 44 until the desired control position is achieved. When the desired control position is achieved the proper indicator symbol appears in the viewing portion to signal the operator that the transmission is in the desired operating range. The detent 38, of course, thereafter maintains the operating lever in the selected position until another operating range change is desired.

Having thus described the invention, what is claimed is:

1. A position indicating control lever assembly comprising, in combination, a lever including a body defining a viewing portion, a base, means supporting said lever on said base for pivotal movement about an axis of said base through an included angle of less than 180° and between a plurality of angularly spaced control positions, a flexible ribbon element having an intermediate portion with a plurality of longitudinally spaced indicator symbols thereon corresponding to the control positions of said lever, means on said lever defining a ribbon support adjacent said viewing portion, said ribbon element intermediate portion being trained over said support and adapted for movement relative thereto longitudinally of said ribbon element with respective ones of said indicator symbols being visible in said viewing portion, and means connecting said ribbon element on opposite sides of said intermediate portion to said base so that pivotal movement of said lever effects relative movement between said ribbon element and said ribbon support longitudinally of said ribbon element and consequent sequential indexing of said indicator symbols with respect to said viewing portion.

2. The position indicating control lever assembly recited in claim 1 and further including detent means disposed between said lever and said base for releasably maintaining said lever in any one of said angularly spaced control positions.

3. A position indicating lever assembly for installation on a panel support comprising, in combination, a bezel member defining an elongated aperture, a lever including a body defining a viewing portion, means supporting said lever on said bezel member for pivotal movement about an axis defined by said bezel member, said lever projecting through said elongated aperture such that the ends of the latter limit the angular movement of said lever to an included angle of less than 180°, detent means between said bezel member and said lever for releasably maintaining said lever in any one of a plurality of angularly spaced control positions, means on said lever defining a ribbon support disposed adjacent said viewing portion, a flexible ribbon element of finite length having an intermediate portion with a plurality of longitudinally spaced indicator symbols thereon corresponding to the control positions of said lever, said ribbon element being supported on said lever and trained over said ribbon support and adapted for sliding movement relative thereto longitudinally of said ribbon element with respective ones of said indicator symbols being visible in said viewing portion, means on said lever defining a first ribbon aperture, means on said lever defining a second ribbon aperture, said ribbon element entering said lever through said first ribbon aperture and exiting said lever through said second ribbon aperture, means attaching one end of said ribbon element to said bezel adjacent one end of said elongated aperture, and means attaching the other end of said ribbon element to said bezel adjacent the other end of said aperture so that pivotal movement of said lever effects relative sliding movement brween said ribbon element and said ribbon support longitudinally of said ribbon element with consequent sequential indexing of said indicator symbols with respect to said viewing portion.

* * * * *